(12) United States Patent
Schroeder (10) Patent No.: US 6,266,945 B1
(45) Date of Patent: Jul. 31, 2001

(54) ICE SUPPLY SYSTEM

(75) Inventor: Alfred A. Schroeder, San Antonio, TX (US)

(73) Assignee: Lancer Partnership, Ltd., San Antonio, TX (US)

(*) Notice: Subject to any disclaimer, the term of this patent is extended or adjusted under 35 U.S.C. 154(b) by 0 days.

(21) Appl. No.: 09/411,457

(22) Filed: Oct. 1, 1999

(51) Int. Cl.[7] ........................................ B65B 1/04
(52) U.S. Cl. ..................... 53/473; 406/156; 222/146.6
(58) Field of Search ..................... 53/560, 459, 473; 222/129.2, 129.4, 146.6, 135; 406/153

(56) References Cited

U.S. PATENT DOCUMENTS

| | | | |
|---|---|---|---|
| 4,104,889 | 8/1978 | Hoenisch | 62/137 |
| 4,124,145 | 11/1978 | Spinner et al. | 222/56 |
| 4,139,029 | * 2/1979 | Geraci . | |
| 4,288,074 | 9/1981 | Kainz | 273/29 |
| 4,368,608 | * 1/1983 | Ray . | |
| 5,104,007 | * 4/1992 | Utter . | |
| 5,165,255 | * 11/1992 | Alvarez et al. . | |
| 5,277,016 | * 1/1994 | Williams et al. . | |
| 5,299,427 | 4/1994 | Miller et al. | 62/66 |
| 5,433,348 | * 7/1995 | Deering et al. . | |
| 5,549,219 | * 8/1996 | Lancaster . | |
| 5,549,421 | 8/1996 | Reinhardt et al. | 406/3 |
| 5,581,982 | * 12/1996 | Schroeder et al. . | |
| 5,619,901 | * 4/1997 | Reese et al. . | |
| 5,630,310 | * 5/1997 | Chadwell . | |
| 5,706,660 | * 1/1998 | Shank et al. . | |
| 5,758,992 | 6/1998 | Sawallisch | 406/151 |
| 5,829,646 | * 11/1998 | Schroeder et al. . | |
| 5,950,866 | * 9/1999 | Lancaster . | |
| 5,960,701 | * 10/1999 | Reese et al. . | |
| 6,093,312 | * 7/2000 | Boulter . | |

* cited by examiner

*Primary Examiner*—Eugene Kim
(74) *Attorney, Agent, or Firm*—Christopher L. Makay (57) ABSTRACT

An ice supply system includes a dispenser system, an ice bagger system, and an ice transport system for providing a supply of ice. The ice transport system is operatively linked with the dispenser system for transporting ice to the dispenser system and with the ice bagger system for transporting ice to the ice bagger system.

29 Claims, 5 Drawing Sheets

ICE SUPPLY SYSTEM

BACKGROUND OF THE INVENTION

1. Field of the Invention

The present invention generally relates to dispensing equipment and, more particularly, but not by way of limitation, to a system for generating, transporting, and dispensing of ice without exposure to external contaminants.

2. Description of the Related Art

Prior to being dispensed to a consumer, ice is often subjected to a variety of potentially unfavorable and even unhealthy conditions. In a store, for example, ice is typically sold in bags or provided as a condiment for consumption with beverages sold at that store.

To accommodate these consumer needs, ice is provided for consumption via an dispenser system, an ice company, and/or an ice bagger unit. In particular, it is common in the beverage industry to incorporate an ice bin with a beverage dispenser system to provide a supply of ice to the consumer. Thus, ice for a beverage can either be accessed directly from the storage bin or from an ice dispenser in engagement with the storage bin.

An ice company provides individual bags of ice at the store to consumers, or alternatively, an ice bagger unit supplies individual bags of ice to consumers. The ice bagger unit includes a hopper for feeding ice into individual bags. The ice bagger unit for storing individual bags of ice until accessed by consumers also includes a holding bin or "merchandiser".

Unfortunately, ice companies are often expensive and less than reliable in supplying individual bags of ice, and, for dispenser systems and ice bagger units alike, there currently exists no satisfactory means by which to transfer large quantities of ice from an ice making system to the ice bin and the hopper, respectively, without exposure to a variety of potentially unfavorable and even unhealthy conditions. Providing a continuous supply of ice has long been problematic, especially if an dispenser system or an ice bagger unit is exposed to large volumes of consumers as well as impurities and contaminants associated with ice. To satisfy the large demand for ice, these systems currently feature either automatic icemakers of limited capacity or require manual replenishment by an attendant from a large-capacity ice making system.

Often, ice within the ice bin or an attendant placing ice directly therein via a bucket replenishes the hopper. In addition to being tedious and labor intensive, manual ice replenishment, however, is less than sanitary due to ice contact with the atmosphere, the bucket, and even the attendant. Manual ice replenishment is also hazardous in that consumers and beverage dispenser attendants alike trip and fall on ice that lands on the floor during the replenishment process.

Current dispenser system and ice bagger unit design only partially address this issue of sanitary transport of large volumes of ice. As such, some ice beverage dispenser systems and ice bagger units include sanitizing systems for dispensing a sanitizing solution to disinfect the dispenser system and the ice bagger unit. However, there is no sanitary means by which to transfer ice from an ice making system to an dispenser and an ice bagger unit without unwanted environmental or human exposure.

Accordingly, there is a long felt need for a system for generating, transporting, and dispensing large quantities of ice without exposure to external contaminants.

SUMMARY OF THE INVENTION

In accordance with the present invention, an ice supply system includes a dispenser system, an ice bagger system, and an ice transport system for providing a supply of ice. The ice transport system is operatively linked with the dispenser system for transporting ice to the dispenser system and with the ice bagger system for transporting ice to the ice bagger system.

The ice transport system includes an ice dispenser bin and an icemaker for delivering ice into the ice dispenser bin. The ice dispenser bin further includes an ice conduit system linked and in communication with the ice dispenser bin, the dispenser system, and the ice bagger system for facilitating ice flow from the ice dispenser bin to the dispenser system and the ice bagger system, thereby transporting ice without exposure to external contaminants. The ice conduit system includes a diverter/shifter assembly for selectively facilitating ice flow from the ice dispenser bin to one of the dispenser system and the ice bagger system The dispenser system dispenses ice received from the ice transport system and may include the capability to dispense beverages as well. The ice bagger system packages ice received from the ice transport system.

The ice supply system further includes an ice delivery controller system linked and in engagement with the ice transport system, the dispenser system, and the ice bagger system for implementing a routine for operating the ice supply system. The ice delivery controller system includes a stand-alone unit for integration and engagement with the ice transport system, the dispenser system, and the ice bagger system.

In accordance with the present invention, a method for supplying ice includes engaging an ice delivery controller system with a dispenser system, an ice bagger system and an ice transport system operatively linked with the dispenser system and the ice bagger system. The method for supplying ice further includes facilitating ice flow from the ice transport system to the dispenser system and the ice bagger system via the ice delivery controller system.

The ice delivery controller system includes a controller unit electrically linked with the ice transport system, the dispenser system, and the ice bagger system for coordinating ice flow from the ice transport system to the dispenser system and the ice bagger system. An ice transport sensory unit disposed on the ice transport system determines ice quantity within the ice transport system and generates an ice transport sensory signal thereof. A dispenser sensory unit disposed on the dispenser system determines ice quantity within the dispenser system and generates a dispenser sensory signal thereof. An ice bagger sensory unit disposed on the ice bagger system determines ice quantity within the ice bagger system and generates an ice bagger sensory signal thereof.

The step of facilitating ice flow from the ice transport system to the dispenser system and the ice bagger system via the ice delivery controller system includes receiving, via the controller unit, the ice transport sensory signal from the ice transport system indicating the ice transport system needs ice replenishment. Upon receipt of the ice transport sensory signal, the controller unit activates an icemaker of the ice transport system to deliver ice into an ice dispenser bin of the ice transport system. The controller unit then deactivates the icemaker of the ice transport system when the ice transport sensory signal indicates the ice transport system no longer needs ice replenishment.

The step of facilitating ice flow from the ice transport system to the dispenser system and the ice bagger system via the ice delivery controller system further includes receiving, via the controller unit, the dispenser sensory signal from the dispenser system indicating the dispenser system needs ice replenishment. Upon receipt of the dispenser sensory signal, the controller unit engages an ice conduit system of the ice transport system to communicate an ice dispenser bin of the ice transport system with the dispenser system. The controller unit then engages the ice transport system to furnish ice to the dispenser system. The controller unit finally disengages the ice transport system when the dispenser sensory signal indicates the dispenser system no longer needs ice replenishment.

The step of facilitating ice flow from the ice transport system to the dispenser system and the ice bagger system via the ice delivery controller system still further includes receiving, via the controller unit, the ice bagger sensory signal from the ice bagger system indicating the ice bagger system needs ice replenishment. Upon receipt of the ice bagger sensory signal, the controller unit engages an ice conduit system of the ice transport system to communicate an ice dispenser bin of the ice transport system with the ice bagger system. The controller unit then engages the ice transport system to furnish ice to the ice bagger system. The controller unit finally disengages the ice transport system when the ice bagger sensory signal indicates the ice bagger system no longer needs ice replenishment.

It is therefore an object of the present invention to provide an ice supply system for generating, transporting, and dispensing ice without exposure to external contaminants.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein, however, it is to be understood that the disclosed embodiments are merely exemplary of the invention, which may be embodied in various forms, the figures are not necessarily to scale, and some features may be exaggerated to show details of particular components or steps.

Figure 1:
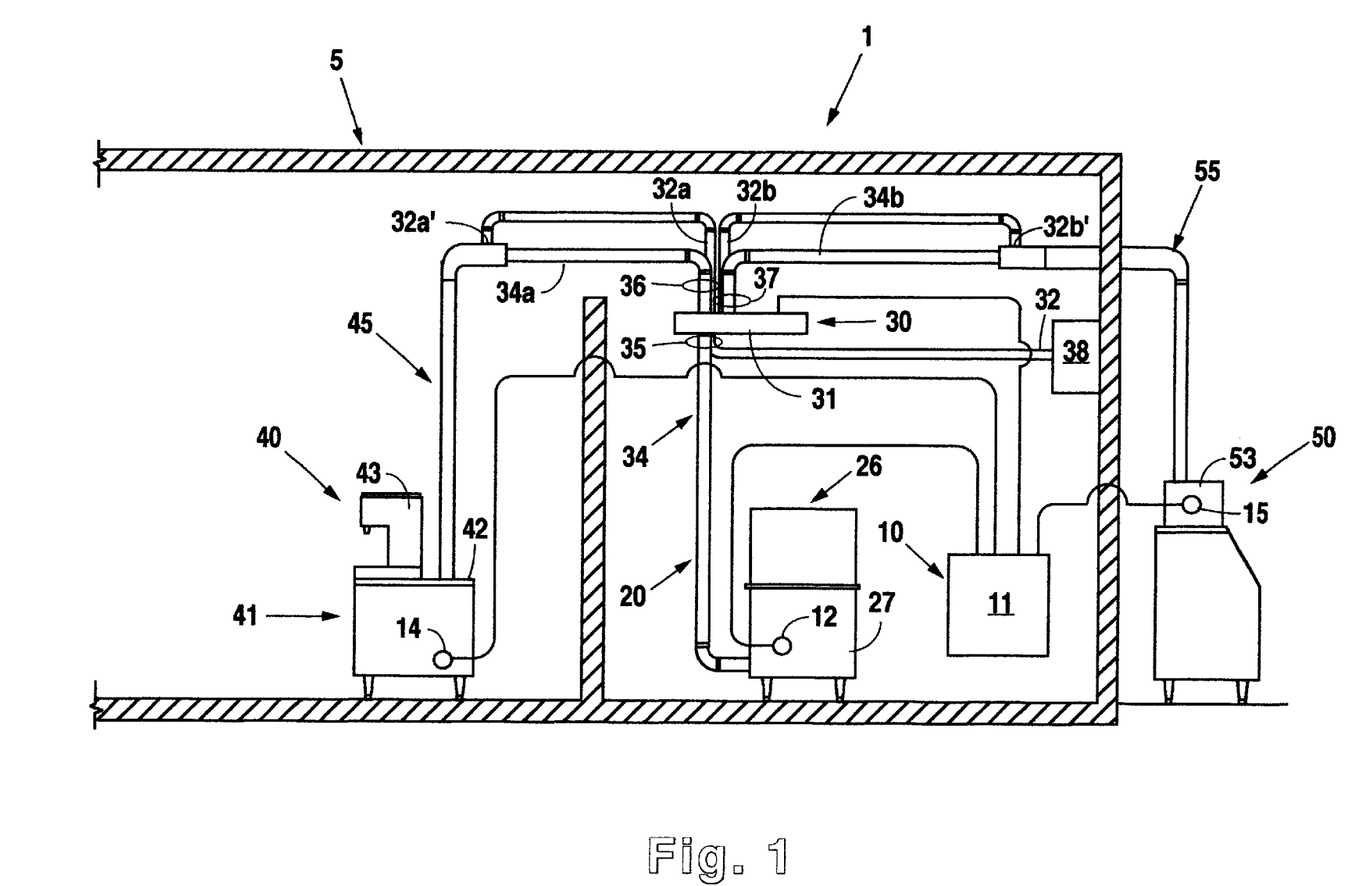
FIG. 1 is a schematic view illustrating an ice supply system according to the preferred embodiment for generating, transporting, and dispensing large quantities of ice without exposure to external contaminants.

As illustrated in FIG. 1, an ice supply system 1 includes an ice transport system 20 for providing a supply of ice therefrom. The ice transport system 20 includes a dispenser ice bin 27 having an unbridger for delivering ice supplied thereto into an ice conduit system 30. The ice transport system 20 preferably includes an icemaker 26 for generating and supplying ice to the dispenser ice bin 27. Although those skilled in the art will recognize other suitable means for transporting a supply of ice, the preferred ice transport system 20 comprises an ice transport system disclosed in U.S. patent application Ser. No. 09/364,794, entitled "Vacuum Pneumatic System for Conveyance of Ice" and assigned to Lancer Ice Link, Ltd. of Orange Calif., incorporated herein by reference.

The ice supply system 1 includes a dispenser system 40 for providing at least ice or a desired beverage as well as ice to accompany that beverage. Although those skilled in the art will recognize other suitable means for dispensing a supply of ice, the dispenser system 40 contemplated for use is any system that dispenses at least ice or beverages in combination with ice as a condiment. Examples of such dispenser systems include, but are not limited to, those disclosed in U.S. Pat. No. 5,829,646, entitled "Ice Dispenser and Combination Ice and Beverage Dispenser" and U.S. Pat. No. 5,433,348, entitled "Modular Dispensing Tower", which are assigned to Lancer Partnership, Ltd. of San Antonio, Tex., incorporated herein by reference.

As shown in FIG. 1, the dispenser system 40 of the preferred embodiment includes an dispenser unit 41 for facilitating the dispensing of a desired beverage and accompanying ice. In particular, the dispenser unit 41 includes an ice bin 42 for receiving and storing ice received from the ice making system 20. The dispenser unit 41 further includes an dispensing tower 43 for dispensing the beverage and ice directly to a consumer. The ice bin 42 and the dispensing tower 43 are linked with one another so that the dispensing tower 43 dispenses ice from the ice bin 42.

The ice supply system 1 includes an automatic ice bagger 50 for providing individual bags of ice to consumers. Although those skilled in the art will recognize other suitable means for packing ice for consumption, the automatic ice bagger 50 contemplated for use is any system capable of receiving a supply of ice, automatically placing the ice in a bag, and then sealing the bag for delivery into a merchandiser. An example of an automatic ice bagger that could rendered suitable to receive a supply of ice, automatically place the ice in a bag, and then seal the bag for delivery into a merchandiser is disclosed in U.S. Pat. Nos. 5,458,851 and 5,630,310, entitled "Automatic Ice Bagger with Self-Contained Sanitizing System" and U.S. Pat. No. 5,581,982, entitled "Method for Automatically Bagging Ice Using a Timer and Multipositional Electronic Scale, all of which are assigned to Packaged Ice, Inc. of Houston, Tex., incorporated herein by reference. In the preferred embodiment, the ice bagger system 50 includes an ice bagger unit 51 for packaging ice into individual bags for consumption. The ice bagger unit 51 provides an ice storage hopper 53 for receiving ice from the ice making system 20 and feeding ice into individual bags.

The preferred ice transport system 20 includes an ice conduit system 30 linked with the dispenser system 40 and the automatic ice bagger 50 for facilitating ice transport from the dispenser ice bin 27 to the dispenser system 40 and the automatic ice bagger system 50. The ice conduit system 30 includes a diverter/shifter assembly 31 as disclosed in U.S. patent application Ser. No. 09/364,794, entitled "Vacuum Pneumatic System for Conveyance of Ice" and assigned to Lancer Ice Link, Ltd. of Orange, Calif., incorporated herein by reference. Specifically, the diverter/shifter assembly 31 acts as a switch that is selectively engaged to complete a desired path or paths provided by the ice conduit system 30 between the dispenser ice bin 27 and the dispenser system 40 and/or the automatic ice bagger system 50, thereby facilitating ice flow about the ice supply system 1 without exposure to external contaminants.

As shown in FIG. 1, the preferred ice conduit system 30 includes conveying conduits 35 linked and in communication with the diverter/shifter assembly 31 as well as first receiving conduits 36 and second receiving conduits 37, each linked and in communication with the diverter/shifter assembly 31. The conveying conduits 35, in turn, are linked and communication with the dispenser ice bin 27 for facilitating ice transport from the dispenser ice bin 27 to the diverter/shifter assembly 31. The first receiving conduits 36 are linked and in communication with the dispenser system 40 for facilitating ice transport from the diverter/shifter assembly 31 to the dispenser system 40. The second receiving conduits 37 are linked and in communication with the automatic ice bagger system 50 for facilitating ice transport from the diverter/shifter assembly 31 to the automatic ice bagger system 50. Therefore, in operation, the diverter/shifter assembly 31 aligns the conveying conduits 35 with either the first or second receiving conduits 36, 37, thereby completing a path for ice flow therethrough.

Specifically, the conveying conduits 35 include an ice conduit 34 for passing ice therethrough and a vacuum line 32 for inducing ice movement along the ice supply system 1. The ice conduit 34 is linked and communication with the ice dispenser bin 27. Similarly, the first receiving conduits 36 include an dispenser conduit 34a for passing ice therethrough and an dispenser vacuum line 32a for inducing ice movement ice along the ice supply system 1. The dispenser conduit 34a is linked and in communication with dispenser system 40 for facilitating ice transport to the ice bin 42. The second receiving conduits 37 include an ice bagger ice conduit 34b for passing ice therethrough and an ice bagger vacuum line 32a for inducing ice movement along the ice supply system 1. The ice bagger ice conduit 34b is linked and in communication with automatic ice bagger system 50 for facilitating ice transport to the ice storage hopper 53.

Inasmuch, the ice transport system 30 further includes a vacuum pump 38 linked with the vacuum line 32 from the conveying conduits 35. As the conveying conduits 35 are linked with the first receiving conduits 36 and/or the second receiving conduits 37, the vacuum line 32 is thus in operative engagement with the dispenser vacuum line 32a and/or the ice bagger vacuum line 32b.

In operation, if ice is required by the dispenser system 40 for example, the vacuum line 32 and the dispenser vacuum line 32a act in combination to create a pressure differential on the ice flowing though the ice conduit 34 and the ice beverage dispenser conduit 34a, thereby drawing the ice from the dispenser ice bin 27 of the ice transport system 20 toward the ice bin 42 of the dispenser system 40. As shown in FIG. 1, vacuum pressure from the vacuum line 32 and the ice beverage dispenser vacuum line 32a is applied at a first vacuum pressure application point 32a', located substantially near the ice bin 42, for drawing ice toward the ice bin 42. In the same manner, as shown in FIG. 1, vacuum pressure from the vacuum line 32 and the ice bagger vacuum line 32b is applied at a second vacuum pressure application point 32b', located substantially near the ice storage hopper 53, for drawing ice toward the ice storage hopper 53.

It must be added that the preferred vacuum pressure for the vacuum pump 38 comprises a negative pressure exerted at the first vacuum pressure application point 32a'and/or second vacuum pressure application point 32b'for pulling ice along the ice supply system 1. As those of ordinary skill in the art will recognize, other embodiments contemplate the vacuum pump 38 exerting a positive pressure by positioning the first vacuum pressure application point 32a'substantially near the dispenser ice bin 27, thereby pushing the ice toward the ice bin 42. In the same manner, by positioning the second vacuum pressure application point 32b'substantially near the dispenser ice bin 27, a positive pressure is contemplated for pushing the ice toward the ice storage hopper 53.

The preferred ice supply system 1 includes an ice delivery controller system 10 for implementing a routine for operating the ice supply system 1. The preferred ice delivery controller system 10 includes a controller unit 11 for executing the operational routine for the ice supply system 1. Although those of ordinary skill in the art will recognize other suitable means for executing an operational routine for the ice supply system 1, the preferred controller unit 11 comprises a standard microcontroller widely known in the industry.

The ice delivery controller system 10 further includes an ice maker sensory unit 12 electrically linked with the controller unit 11 and disposed along the dispenser ice bin 27 for determining the quantity of ice therein and generating an ice maker sensory signal thereof. In a similar manner, the ice delivery controller system 10 includes an sensory unit 14 electrically linked with the controller unit 11 and disposed along the ice bin 42 as well as an ice bagger sensory unit 15 electrically linked with the controller unit 11 and disposed along the ice storage hopper 53, each for determining ice quantity and generating an dispenser system signal and an ice bagger sensory signal, respectively. It should be added that although those of ordinary skill in the art will recognize other suitable means for determining ice quantity, the preferred ice maker sensory unit 12, the sensory unit 14, and the ice bagger sensory unit 15 determine ice quantity as a function of height using a photo-emitter and detector pair.

As shown in FIG. 1, the preferred ice delivery controller system 10 comprises a stand-alone unit for integration and engagement with the ice supply system 1. Other embodiments contemplate the controller unit 11 as a separate "add-on" unit linked and in engagement with each system of the ice supply system 1, i.e. the controller for the dispenser system 40, the controller for the ice transport system 20, and/or the controller for the automatic ice bagger system 50.

Accordingly, FIGS. 2–5 illustrate the preferred routine for operating the ice supply system 1 of FIG. 1. Inasmuch, although those of ordinary skill in the art will recognize the application of the ice supply system 1 in a variety of commercial and private settings, FIG. 1 illustratively depicts the ice supply system 1 in operative engagement with a convenience store 5. In FIG. 1, the dispenser system 40 is located in a main room of the convenience store 5 for customer access. The ice delivery controller system 10 and the ice transport system 20 are located in a back room of the convenience store 5 away from the customer. The automatic ice bagger system 50 is located outside of the convenience store 5 so that customers can access and even open potentially messy, individual ice bags outside.

Figure 2:
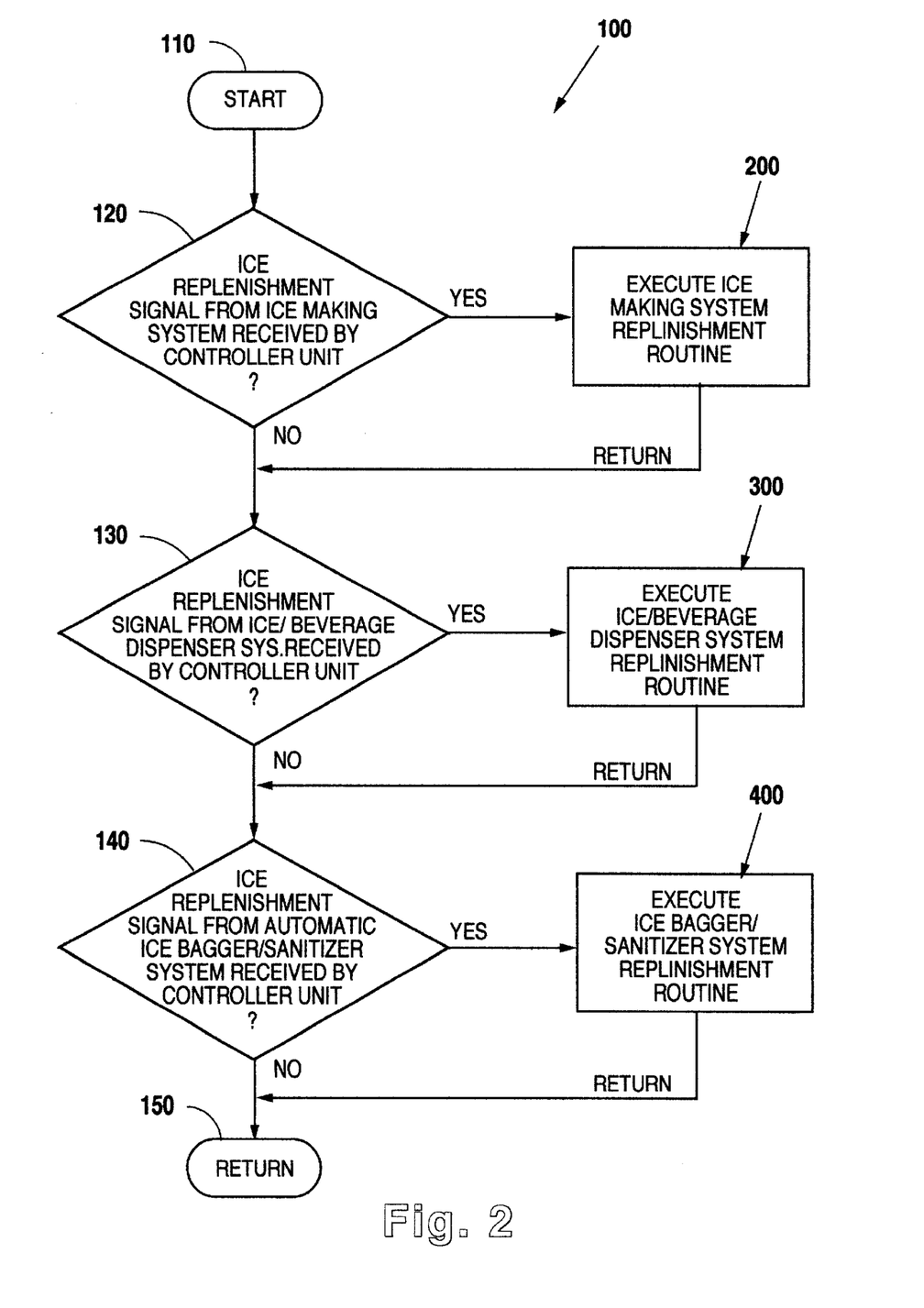
FIG. 2 is a flow diagram illustrating a main routine for operating the ice supply system of FIG. 1.

FIG. 2 schematically depicts a main routine 100 for operating the ice supply system 1. Step 110 starts the main routine 100. In step 120, the controller unit 11 awaits for an icemaker sensory signal from the ice transport system 20 indicating that the dispenser ice bin 27 needs replenishment.

If it does not receive the icemaker sensory signal, the controller unit 11 progresses to step 130. However, on receipt of the ice maker sensory signal, the controller unit 11 executes an ice transport system replenishment routine 200 before advancing to step 130.

In a similar manner, the controller unit 11 in step 130 awaits for a sensory signal from the dispenser system 40 indicating that the ice bin 42 needs replenishment. If it does not receive the sensory signal, the controller unit 11 progresses to step 140. However, on receipt of the sensory signal, the controller unit 11 executes an dispenser system replenishment routine 300 before advancing to step 140.

Likewise, the controller unit 11 in step 140 awaits for an ice bagger sensory signal from the automatic ice bagger system 50 indicating that the storage hopper 53 needs replenishment. If it does not receive the ice bagger sensory signal from the automatic ice bagger system 50, the controller unit 11 progresses to step 150. However, on receipt of the ice bagger sensory signal, the controller unit 11 executes an ice bagger system replenishment routine 400 before advancing to step 150. As such, in step 150 the controller unit 110 returns to step 110 to restart the main routine 100.

Figure 3:
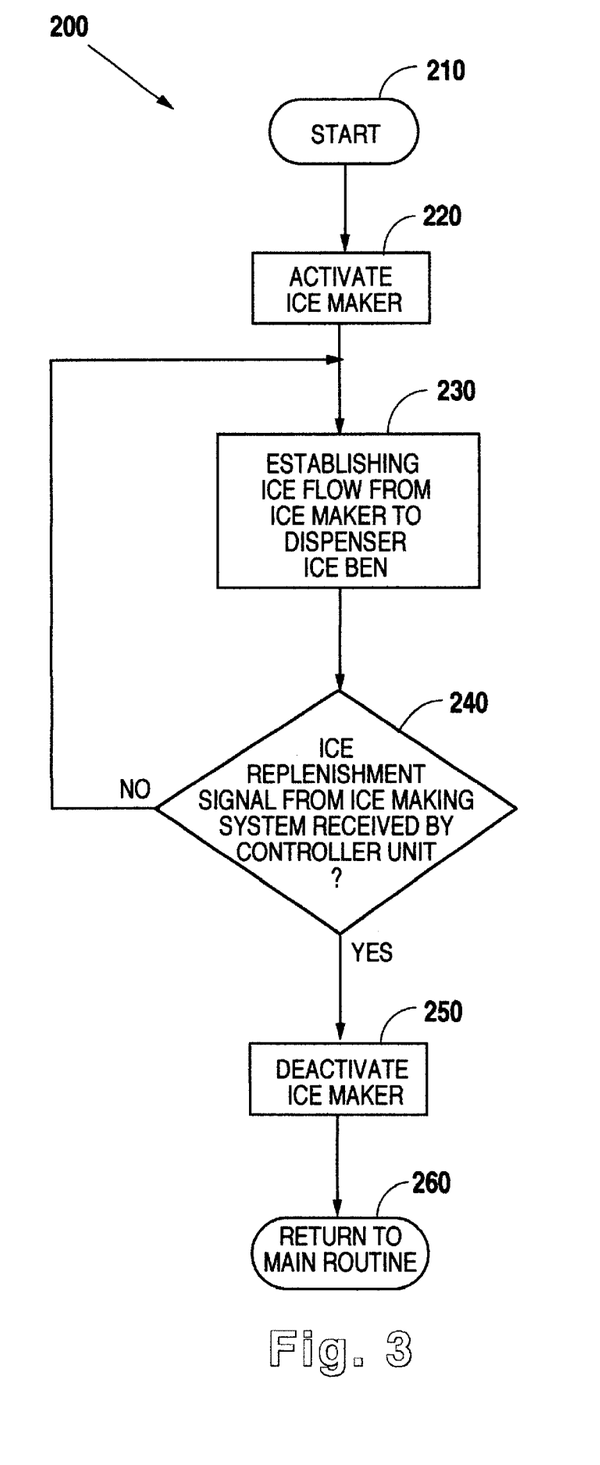
FIG. 3 is a flow diagram illustrating an ice making system replenishment routine executed by the main routine of FIG. 2.

FIG. 3 is a flow diagram illustrating the ice transport system replenishment routine 200 for providing a supply of ice to the dispenser ice bin 27. Step 210 starts the ice transport system replenishment routine 200 for the ice supply system 1. The controller unit 11 in step 220 emits a signal to activate the icemaker 26. In step 230, the controller unit 11 establishes ice flow from the icemaker 26 to the dispenser ice bin 27. In step 240, the controller unit 11 awaits for an icemaker sensory signal from the ice maker sensory unit 12 indicating that the dispenser ice bin 27 contains a desired amount of ice. If it does not receive this ice maker sensory signal, the controller unit 11 loops back to step 130 to continue ice flow from the ice maker 26 to the dispenser bin 27. If, however, it receives this icemaker sensory signal, the controller unit 11 progresses to step 250. In step 250, the controller unit 11 emits a signal to deactivate the icemaker 26 before returning to the main routine 100 via step 260.

Figure 4:
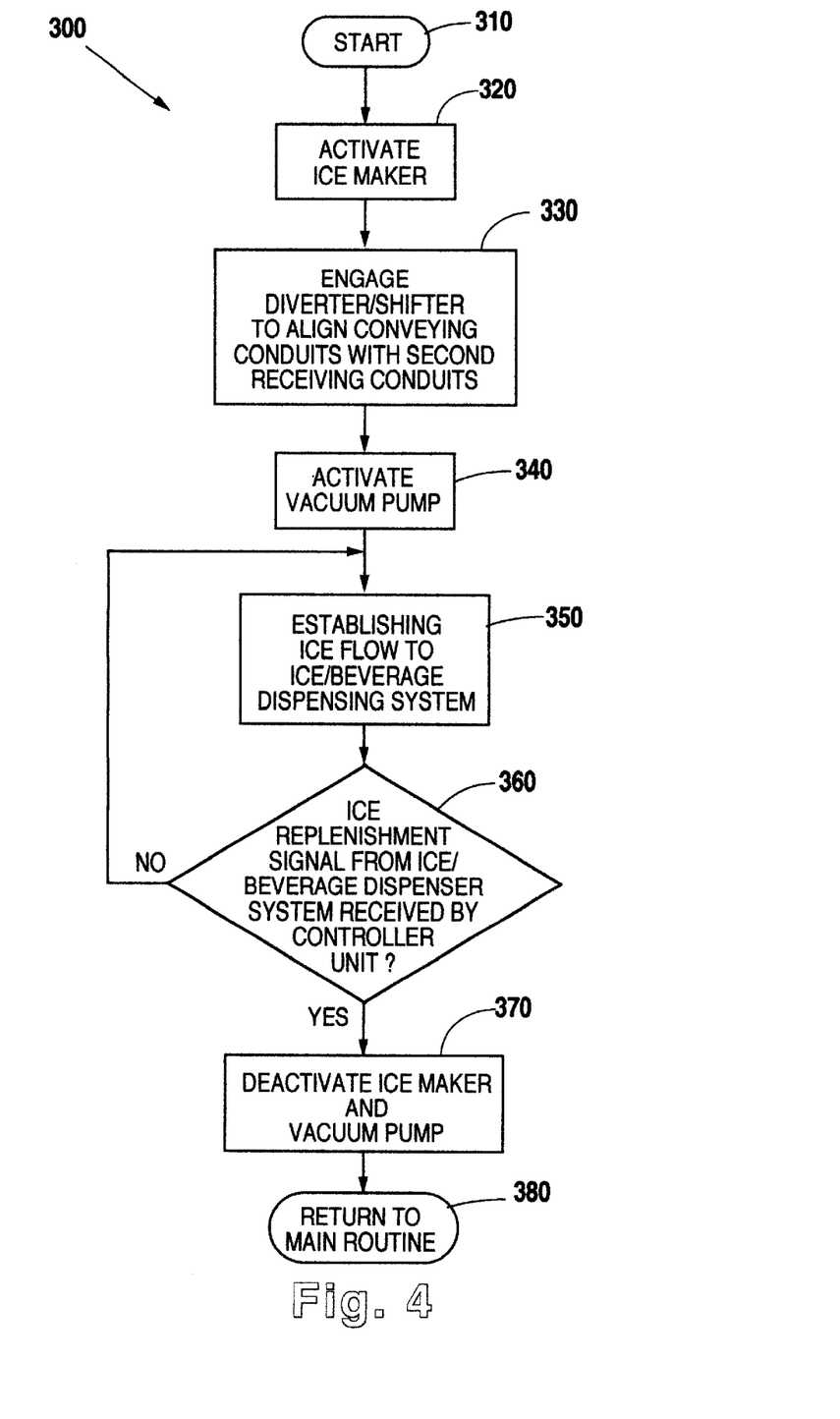
FIG. 4 is a flow diagram illustrating an dispenser system replenishment routine executed by the main routine of FIG. 2.

In FIG. 4 is a flow diagram illustrating the dispenser system replenishment routine 300 for providing a supply of ice to the ice bin 42. Step 310 starts the dispenser system replenishment routine 300 for the ice supply system 1. The controller unit 11 in step 320 emits a signal to activate the icemaker 26. Furthermore, in step 320, the controller unit 11 establishes ice flow from the icemaker 26 to the dispenser ice bin 27.

In step 330, the controller unit 11 engages the diverter/shifter assembly 31, thereby aligning the conveying conduits 35 with the first receiving conduits 36. The controller unit 11 in step 340 activates the vacuum pump 38, thereby establishing ice flow from the dispenser ice bin 27 to the ice bin 42 via step 350. In step 360, the controller unit 11 awaits for a dispenser sensory signal from the dispenser sensory unit 14 indicating that the dispenser ice bin 42 contains a desired amount of ice. If it does not receive this sensory signal, the controller unit 11 loops back to step 350 to continue ice flow. However, on receipt of this sensory signal, the controller unit 11 in step 370 emits a signal to deactivate the icemaker 26. Additionally, in step 370, the controller unit 11 stops ice flow from the dispensing ice bin 27 to the ice bin 42 by deactivating the vacuum pump 38 before returning to the main routine 100 via step 380.

Figure 5:
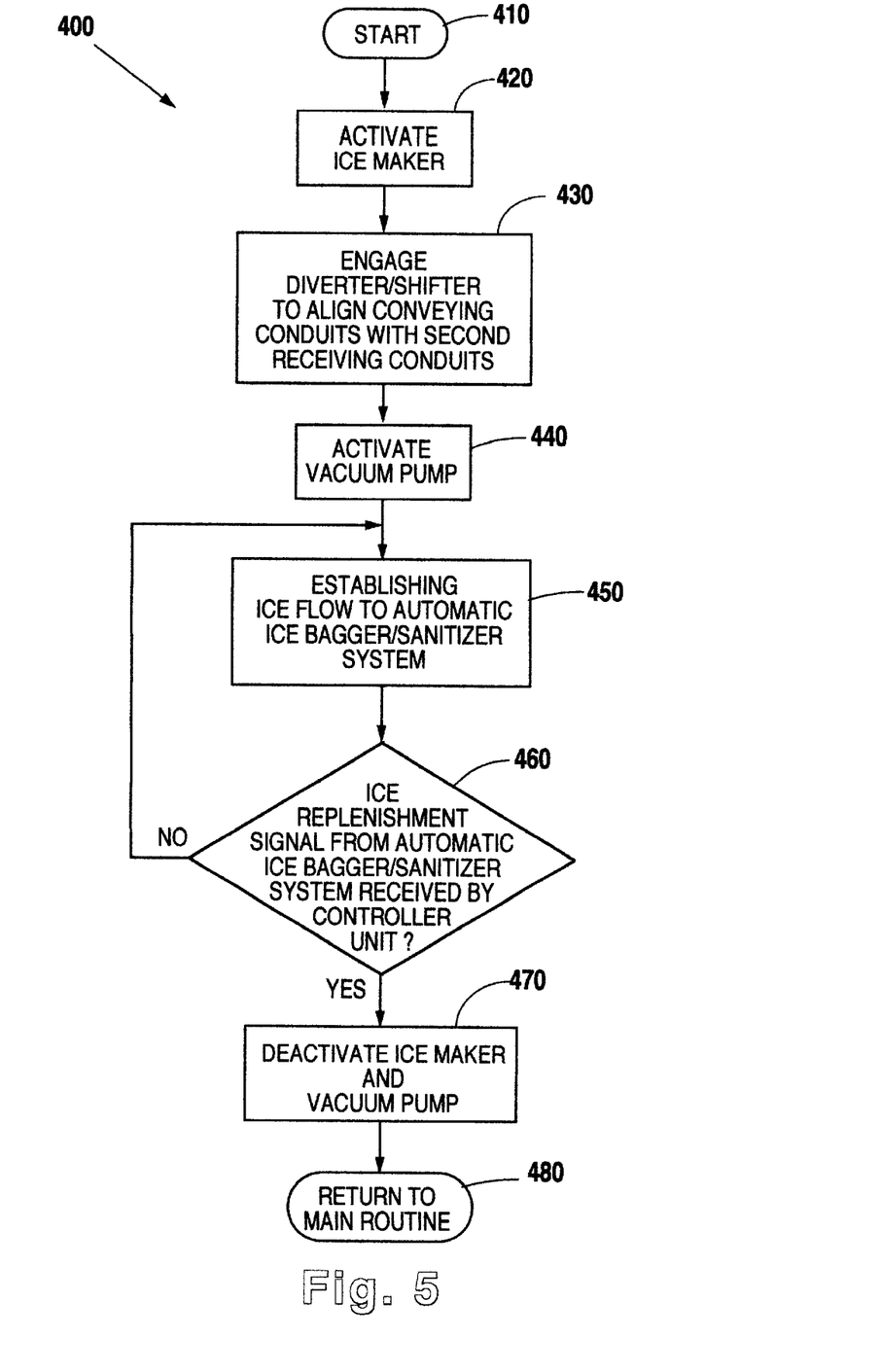
FIG. 5 is a flow diagram illustrating an ice bagger system replenishment routine executed by the main routine of FIG. 2.

FIG. 5 is a flow diagram illustrating the ice bagger system replenishment routine 400 for providing a supply of ice to the ice storage hopper 53. Step 410 starts the ice bagger system replenishment routine 400 for the ice supply system 1. The controller unit 11 in step 420 emits a signal to activate the icemaker 26. Furthermore, in step 420, the controller unit 11 establishes ice flow from the icemaker 26 to the dispenser ice bin 27.

In step 430, the controller unit 11 engages the diverter/shifter assembly 31 thereby aligning the conveying conduits 35 with the second receiving conduits 37. The controller unit 11 in step 440 activates the vacuum pump 38, thereby establishing ice flow from the dispenser ice bin 27 to the ice storage hopper 53 via step 450. In step 460, the controller unit 11 awaits for an ice bagger sensory signal from the ice bagger sensory unit 15 indicating that the ice storage hopper 53 contains a desired amount of ice. If it does not receive this ice bagger sensory signal, the controller unit 11 loops back to step 450 to continue ice flow. However, on receipt of this ice bagger sensory signal, the controller unit 11 in step 470 emits a signal to deactivate the icemaker 26. Additionally, in step 470, the controller unit 11 stops ice flow from the dispenser ice bin 27 to the ice storage hopper 53 by deactivating the vacuum pump 38 before returning to the main routine 100 via step 480.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. An ice supply system, comprising:
   a dispenser system; and
   an ice transport system coupled with the dispenser system, the ice transport system, comprising:
      an ice bin having a supply of ice therein,
      an ice conduit system coupling the ice bin with the dispenser system,
      a vacuum pump, and
      a vacuum line system coupling the vacuum pump with the ice conduit system, whereby activation of the vacuum pump creates a pressure differential within the ice conduit system that draws ice from the ice bin into the ice conduit system and delivers the ice to the dispenser system.

2. The ice supply system according to claim 1, wherein the ice transport system further comprises an icemaker for delivering ice into the ice bin.

3. The ice supply system according to claim 1, wherein the dispenser system dispenses ice received from the ice transport system.

4. The ice supply system according to claim 1, wherein the dispenser system dispenses beverages.

5. The ice supply system according to claim 1, further comprising an ice delivery controller system linked and in engagement with the ice transport system and the dispenser system for implementing a routine for operating the ice supply system.

6. An ice supply system, comprising:
   an ice bagger system; and
   an ice transport system coupled with the ice bagger system, the ice transport system, comprising:
      an ice bin having a supply of ice therein,
      an ice conduit system coupling the ice bin with the ice bagger system,
      a vacuum pump, and
      a vacuum line system coupling the vacuum pump with the ice conduit system, whereby activation of the vacuum pump creates a pressure differential within the ice conduit system that draws ice from the ice bin into the ice conduit system and delivers the ice to the ice bagger system.

7. The ice supply system according to claim 6, wherein the ice transport system comprises an ice maker for delivering ice into the ice dispenser bin.

8. The ice supply system according to claim 6, wherein the ice bagger system packages ice received from the ice transport system.

9. The ice supply system according to claim 6, further comprising an ice delivery controller system linked and in engagement with the ice transport system and the ice bagger system for implementing a routine for operating the ice supply system.

10. An ice supply system, comprising:
a dispenser system;
an ice bagger system; and
an ice transport system coupled with the dispenser system and with the ice bagger system, the ice transport system, comprising:
an ice bin having a supply of ice therein,
a first ice conduit system coupling the ice bin with the dispenser system,
a second ice conduit system coupling the ice bin with the ice bagger system,
a vacuum pump,
a first vacuum line system coupling the vacuum pump with the first ice conduit system, whereby activation of the vacuum pump creates a pressure differential within the first ice conduit system that draws ice from the ice bin into the first ice conduit system and delivers the ice to the dispenser system,
a second vacuum line system coupling the vacuum pump with the second ice conduit system, whereby activation of the vacuum pump creates a pressure differential within the second ice conduit system that draws ice from the ice bin into the second ice conduit system and delivers the ice to the ice bagger system, and
a diverter/shifter assembly that selectively facilitates ice delivery from the ice bin into one of the dispenser system and the ice bagger system.

11. The ice supply system according to claim 10, wherein the ice transport system further comprises an icemaker for delivering ice into the ice bin.

12. The ice supply system according to claim 10, wherein the dispenser system dispenses ice received from the ice transport system.

13. The ice supply system according to claim 10, wherein the dispenser system dispenses beverages.

14. The ice supply system according to claim 10, wherein the ice bagger system packages ice received from the ice transport system.

15. The ice supply system according to claim 10, further comprising:
an ice delivery controller system linked and in engagement with the ice transport system, the dispenser system, and the ice bagger system for implementing a routine for operating the ice supply system.

16. The ice supply system according to claim 15, wherein the ice delivery controller system comprises a stand-alone unit for integration and engagement with the ice transport system, the dispenser system, and the ice bagger system.

17. A method for supplying ice, comprising:
engaging an ice delivery controller system with a dispenser system and an ice transport system operatively linked with the dispenser system, the ice transport system, comprising:
an ice bin having a supply of ice therein,
an ice conduit system coupling the ice bin with the dispenser system,
a vacuum pump, and
a vacuum line system coupling the vacuum pump with the ice conduit system; and
facilitating ice flow between the ice transport system and the dispenser system via the ice delivery controller system by activating the vacuum pump to create a pressure differential within the ice conduit system that draws ice from the ice bin into the ice conduit system and delivers the ice to the dispenser system.

18. The method for supplying ice according to claim 17 wherein the ice delivery controller system comprises:
a controller unit electrically linked with the ice transport system and the dispenser system for coordinating ice flow between the ice transport system and the dispenser system;
an ice transport sensory unit disposed on the ice transport system for determining ice quantity within the ice transport system and generating an ice transport sensory signal thereof; and
a dispenser sensory unit disposed on the dispenser system for determining ice quantity within the dispenser system and generating a dispenser sensory signal thereof.

19. The method for supplying ice according to claim 18 wherein the step of facilitating ice flow between the ice transport system and the dispenser system via the ice controller system, comprises the steps of:
receiving, via the controller unit, the ice transport sensory signal from the ice transport system indicating the ice transport system needs ice replenishment; and
activating, via the controller unit, an ice maker of the ice transport system to deliver ice into the ice bin of the ice transport system; and
deactivating, via the controller unit, the icemaker of the ice transport system when the ice transport sensory signal indicates the ice transport system no longer needs ice replenishment.

20. The method for supplying ice according to claim 18 wherein the step of facilitating ice flow between the ice transport system and the dispenser system via the ice controller system, comprises the steps of:
receiving, via the controller unit, the dispenser sensory signal from the dispenser system indicating the dispenser system needs ice replenishment;
engaging, via the controller unit, the ice transport system to furnish ice to the dispenser system; and
disengaging, via the controller unit, the ice transport system when the dispenser sensory signal indicates the dispenser system no longer needs ice replenishment.

21. A method for supplying ice, comprising:
engaging an ice delivery controller system with an ice bagger system and an ice transport system operatively linked with the ice bagger system, the ice transport system, comprising:
an ice bin having a supply of ice therein,
an ice conduit system coupling the ice bin with the ice bagger system,
a vacuum pump, and
a vacuum line system coupling the vacuum pump with the ice conduit system; and
facilitating ice flow between the ice transport system and the ice bagger system via the ice delivery controller system by activating of the vacuum pump to create a pressure differential within the ice conduit system that draws ice from the ice bin into the ice conduit system and delivers the ice to the ice bagger system.

22. The method for supplying ice according to claim 21 wherein the ice delivery controller system comprises:
   a controller unit electrically linked with the ice transport system and the ice bagger system for coordinating ice flow between the ice transport system and the ice bagger system;
   an ice transport sensory unit disposed on the ice transport system for determining ice quantity within the ice transport system and generating an ice transport sensory signal thereof; and
   an ice bagger sensory unit disposed on the ice bagger system for determining ice quantity within the ice bagger system and generating an ice bagger sensory signal thereof.

23. The method for supplying ice according to claim 22 wherein the step of facilitating ice flow between the ice transport system and the ice bagger system via the ice controller system, comprises the steps of:
   receiving, via the controller unit, the ice transport sensory signal from the ice transport system indicating the ice transport system needs ice replenishment; and
   activating, via the controller unit, an ice maker of the ice transport system to deliver ice into the ice bin of the ice transport system; and
   deactivating, via the controller unit, the icemaker of the ice transport system when the ice transport sensory signal indicates the ice transport system no longer needs ice replenishment.

24. The method for supplying ice according to claim 22 wherein the step of facilitating ice flow between the ice transport system and the ice bagger system via the ice controller system, comprises the steps of:
   receiving, via the controller unit, the ice bagger sensory signal from the ice bagger system indicating the ice bagger system needs ice replenishment;
   engaging, via the controller unit, the ice transport system to furnish ice to the ice bagger system; and
   disengaging, via the controller unit, the ice transport system when the ice bagger sensory signal indicates the ice bagger system no longer needs ice replenishment.

25. A method for supplying ice, comprising:
   engaging an ice delivery controller system with a dispenser system, an ice bagger system and an ice transport system operatively linked with the dispenser system and the ice bagger system, the ice transport system, comprising:
      an ice bin having a supply of ice therein,
      a first ice conduit system coupling the ice bin with the dispenser system,
      a second ice conduit system coupling the ice bin with the ice bagger system,
      a vacuum pump,
      a first vacuum line system coupling the vacuum pump with the first ice conduit system, whereby activation of the vacuum pump creates a pressure differential within the first ice conduit system that draws ice from the ice bin into the first ice conduit system and delivers the ice to the dispenser system,
      a second vacuum line system coupling the vacuum pump with the second ice conduit system, whereby activation of the vacuum pump creates a pressure differential within the second ice conduit system that draws ice from the ice bin into the second ice conduit system and delivers the ice to the ice bagger system, and
      a diverter/shifter assembly; and
   facilitating ice flow from the ice transport system to the dispenser system and the ice bagger system via the ice delivery controller system by activating the vacuum pump and engaging the diverter/shifter assembly to selectively facilitate ice delivery from the ice bin into one of the dispenser system and the ice bagger system.

26. The method for supplying ice according to claim 25 wherein the ice delivery controller system comprises:
   a controller unit electrically linked with the ice transport system, the dispenser system, and the ice bagger system for coordinating ice flow from the ice transport system to the dispenser system and the ice bagger system;
   an ice transport sensory unit disposed on the ice transport system for determining ice quantity within the ice transport system and generating an ice transport sensory signal thereof; and
   a dispenser sensory unit disposed on the dispenser system for determining ice quantity within the dispenser system and generating an dispenser sensory signal thereof; and
   an ice bagger sensory unit disposed on the ice bagger system for determining ice quantity within the ice bagger system and generating an ice bagger sensory signal thereof.

27. The method for supplying ice according to claim 26 wherein the step of facilitating ice flow from the ice transport system to the dispenser system and the ice bagger system via the ice delivery controller system, comprises the steps of:
   receiving, via the controller unit, the ice transport sensory signal from the ice transport system indicating the ice transport system needs ice replenishment; and
   activating, via the controller unit, an ice maker of the ice transport system to deliver ice into the ice bin of the ice transport system; and
   deactivating, via the controller unit, the icemaker of the ice transport system when the ice transport sensory signal indicates the ice transport system no longer needs ice replenishment.

28. The method for supplying ice according to claim 26 wherein the step of facilitating ice flow from the ice transport system to the dispenser system and the ice bagger system via the ice delivery controller system, comprises the steps of:
   receiving, via the controller unit, the dispenser sensory signal from the dispenser system indicating the dispenser system needs ice replenishment;
   engaging, via the controller unit, an ice conduit system of the ice transport system to communicate an ice dispenser bin of the ice transport system with the dispenser system;
   engaging, via the controller unit, the ice transport system to furnish ice to the dispenser system; and
   disengaging, via the controller unit, the ice transport system when the dispenser sensory signal indicates the dispenser system no longer needs ice replenishment.

29. The method for supplying ice according to claim 26 wherein the step of facilitating ice flow from the ice transport system to the dispenser system and the ice bagger system via the ice delivery controller system, comprises the steps of:

receiving, via the controller unit, the ice bagger sensory signal from the ice bagger system indicating the ice bagger system needs ice replenishment;

engaging, via the controller unit, an ice conduit system of the ice transport system to communicate an ice dispenser bin of the ice transport system with the ice bagger system;

engaging, via the controller unit, the ice transport system to furnish ice to the ice bagger system; and disengaging, via the controller unit, the ice transport system when the ice bagger sensory signal indicates the ice bagger system no longer needs ice replenishment.

* * * * *